United States Patent
Liu

(10) Patent No.: US 10,809,355 B2
(45) Date of Patent: Oct. 20, 2020

(54) APPARATUS AND METHOD FOR DETECTING ALIGNMENT OF SENSOR AND CALIBRATING ANTENNA PATTERN RESPONSE IN AN AUTOMOTIVE DETECTION SYSTEM

(71) Applicant: Veoneer US, Inc., Southfield, MI (US)

(72) Inventor: Yong Liu, Ogden, UT (US)

(73) Assignee: VEONEER US, INC., Southfield, MI (US)

( * ) Notice: Subject to any disclaimer, the term of this patent is extended or adjusted under 35 U.S.C. 154(b) by 234 days.

(21) Appl. No.: 15/923,101

(22) Filed: Mar. 16, 2018

(65) Prior Publication Data

US 2019/0025405 A1    Jan. 24, 2019

Related U.S. Application Data

(60) Provisional application No. 62/533,787, filed on Jul. 18, 2017.

(51) Int. Cl.
  *G01S 7/40* (2006.01)
  *G01S 13/58* (2006.01)
  (Continued)

(52) U.S. Cl.
  CPC ............ *G01S 7/4026* (2013.01); *G01S 13/42* (2013.01); *G01S 13/584* (2013.01); *G01S 13/60* (2013.01);
  (Continued)

(58) Field of Classification Search
  CPC ...... G01S 7/4026; G01S 13/42; G01S 13/584; G01S 13/60; G01S 13/87; G01S 13/931
  (Continued)

(56) References Cited

U.S. PATENT DOCUMENTS 5,670,963 A * 9/1997 Kubota ................. G01S 13/931
  342/70
5,964,822 A * 10/1999 Alland ................. G01S 17/931
  701/301
(Continued)

FOREIGN PATENT DOCUMENTS

DE    102011015935 A1    10/2012
DE    102015116441 A1 *    3/2017
(Continued)

OTHER PUBLICATIONS

Order statistic—Wikipedia, This is an old revision of the page, as edited by 134.76.223.13 (talk) at 14:06, May 4, 2017. The present address (URL) is a permanent link to this revision. https://en.wikipedia.org/w/index.php?title=Order_statistic&oldid=778658493 (Year: 2017).*

(Continued)

*Primary Examiner* — Peter M Bythrow
*Assistant Examiner* — Alexander L. Syrkin
(74) *Attorney, Agent, or Firm* — Burns & Levinson, LLP; Steven M. Mills

(57) ABSTRACT

A method for calibrating an antenna pattern of a sensor in an automotive detection system includes receiving reflected signals and generating receive signals indicative of the reflected signals. Processing the receive signals to generate detections of objects including one or more ground-stationary clutter objects, each of the detections being associated with a detected azimuth and detected relative velocity of each ground-stationary clutter object. For each of a plurality of angles with respect to a boresight of an antenna of the sensor, processing the detected azimuth and detected velocity of one of the ground-stationary clutter objects and a signal indicative of velocity of the sensor to generate an actual antenna pattern for the antenna of the sensor. A calibrated antenna pattern for the antenna of the sensor is (Continued)

generated using the actual antenna pattern to adjust an assumed antenna pattern.

12 Claims, 9 Drawing Sheets

(51) Int. Cl.
    *G01S 13/42*     (2006.01)
    *G01S 13/87*     (2006.01)
    *G01S 13/60*     (2006.01)
    *G01S 13/931*     (2020.01)
    *G01S 13/72*     (2006.01)
    *G01S 7/35*     (2006.01)

(52) U.S. Cl.
    CPC ............ *G01S 13/87* (2013.01); *G01S 13/931* (2013.01); *G01S 13/726* (2013.01); *G01S 2007/358* (2013.01); *G01S 2007/403* (2013.01); *G01S 2007/4091* (2013.01); *G01S 2013/93271* (2020.01); *G01S 2013/93272* (2020.01); *G01S 2013/93274* (2020.01)

(58) Field of Classification Search
    USPC .......................................................... 342/81
    See application file for complete search history.

(56) References Cited

U.S. PATENT DOCUMENTS

| | | | | |
|---|---|---|---|---|
| 6,694,277 | B2* | 2/2004 | Schneider | G01S 13/931 |
| | | | | 702/104 |
| 6,900,755 | B2 | 5/2005 | Richardson et al. | |
| 7,681,448 | B1* | 3/2010 | Preston | B60W 40/11 |
| | | | | 73/432.1 |
| 2015/0362587 | A1* | 12/2015 | Rogan | G01S 7/4972 |
| | | | | 702/104 |
| 2016/0209211 | A1* | 7/2016 | Song | G01S 17/931 |
| 2018/0341007 | A1* | 11/2018 | Fetterman | G01S 7/4972 |

FOREIGN PATENT DOCUMENTS

| | | |
|---|---|---|
| DE | 102015116441 A1 | 3/2017 |
| DE | 102015119660 A1 | 5/2017 |
| WO | WO-2015037173 A1 * | 3/2015 |

OTHER PUBLICATIONS

International Search Report and Written Opinion in corresponding International Application No. PCT/US2018/041808 dated Oct. 17, 2018; 23 pages.

"Order Statistic", Wikipedia, May 4, 2017; Retrieved from the Internet: URL:https://en.wikipedia.org/w/index.php?title=Order statistic &oldid=778658493 [retrieved on Oct. 4, 2018].

\* cited by examiner

APPARATUS AND METHOD FOR DETECTING ALIGNMENT OF SENSOR AND CALIBRATING ANTENNA PATTERN RESPONSE IN AN AUTOMOTIVE DETECTION SYSTEM

RELATED APPLICATION

This application is based on and claims the benefit of U.S. Provisional Patent Application No. 62/533,787, filed in the U. S. Patent and Trademark Office on Jul. 18, 2017, the contents of which are incorporated herein in their entirety.

BACKGROUND

1. Technical Field

The present disclosure is related to automotive detection systems such as automotive radar systems, and, in particular, to an apparatus and method for detecting and correcting for misalignment of a sensor, and calibrating the antenna pattern response in an automotive detection system.

2. Discussion of Related Art

In automotive detection systems, such as radar systems or LiDAR systems, the sensor, i.e., radar sensor or LiDAR sensor, can be mounted, i.e., physically attached, to the vehicle body or frame. Detection system performance is typically characterized by detection of reflections from objects in proximity to the vehicle to enable implementation of speed control, collision prevention, and/or other system functions. In such automotive detection systems, it is typically desirable to determine an azimuth angle in the form of a target object bearing angle, the range or distance with respect to the objects, and a Doppler relative velocity between the vehicle and these objects.

For typical vehicle detection applications, it is important to measure the target bearing angle with very high precision. The angle accuracy of a detection system depends on fundamental parameters such as modulation technique, antenna design, component tolerances, assembly precision and/or installation conditions. Furthermore, due to various environmental influences such as mechanical stress or temperature variations, the angle estimation performance might be degraded. Also, alignment of a sensor may be affected by installation of the sensor in the host vehicle, since certain features of the vehicle can alter the electromagnetic performance characteristics of the antenna when it is placed in proximity to these vehicle features. Some of these error sources exhibit a random statistical distribution, while others result in a fixed-angle offset of the sensor module. Monitoring and correcting for misalignment or bias angle can be important in vehicle detection applications.

SUMMARY

According to one aspect, a method for calibrating an antenna pattern of a sensor in an automotive detection system is provided. The method includes: transmitting transmitted signals into a region; receiving reflected signals generated by reflection of the transmitted signals and generating receive signals indicative of the reflected signals; receiving the receive signals; generating a signal indicative of velocity of the sensor; processing the receive signals to generate detections of objects in the region, the objects in the region including one or more ground-stationary clutter objects in the region, each of the detections being associated with a detected azimuth and detected relative velocity of each ground-stationary clutter object; for each of a plurality of angles with respect to a boresight of an antenna of the sensor, processing the detected azimuth and detected velocity of one of the one or more ground-stationary clutter objects and the signal indicative of velocity of the sensor to generate an actual antenna pattern for the antenna of the sensor; using the actual antenna pattern to adjust an assumed antenna pattern to generate a calibrated antenna pattern for the antenna of the sensor.

In some embodiments, the method further comprises, using the calibrated antenna pattern, determining an angle of misalignment of the sensor.

In some embodiments, the objects in the region comprise objects which are moving with respect to ground.

In some embodiments, the method further comprises filtering the detections of objects in the region to substantially eliminate detections of objects which are moving with respect to ground. In some embodiments, the filtering is a statistical filtering. In some embodiments, the filtering comprises using an order statistic.

In some embodiments, the method further comprises generating a correlation azimuth estimate.

According to another aspect, an automotive radar sensor with calibration of an antenna pattern is provided. A transmitter transmits signals into a region. A receiver receives reflected signals generated by reflection of the transmitted signals and generates receive signals indicative of the reflected signals. A processor: (i) receives the receive signals; (ii) generates a signal indicative of velocity of the sensor; iii) processes the receive signals to generate detections of objects in the region, the objects in the region including one or more ground-stationary clutter objects in the region, each of the detections being associated with a detected azimuth and detected relative velocity of each ground-stationary clutter object; (iv) for each of a plurality of angles with respect to a boresight of an antenna of the sensor, processes the detected azimuth and detected velocity of one of the one or more ground-stationary clutter objects and the signal indicative of velocity of the sensor to generate an actual antenna pattern for the antenna of the sensor; and (v) uses the actual antenna pattern to adjust an assumed antenna pattern to generate a calibrated antenna pattern for the antenna of the sensor.

In some embodiments, the processor uses the calibrated antenna pattern to determine an angle of misalignment of the sensor.

In some embodiments, the objects in the region further comprise objects which are moving with respect to ground.

In some embodiments, the processor filters the detections of objects in the region to substantially eliminate detections of objects which are moving with respect to ground. In some embodiments, filtering performed by the processor comprises statistical filtering. In some embodiments, filtering performed by the processor uses an order statistic.

In some embodiments, the processor generates a correlation azimuth estimate.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

Figure 1A:
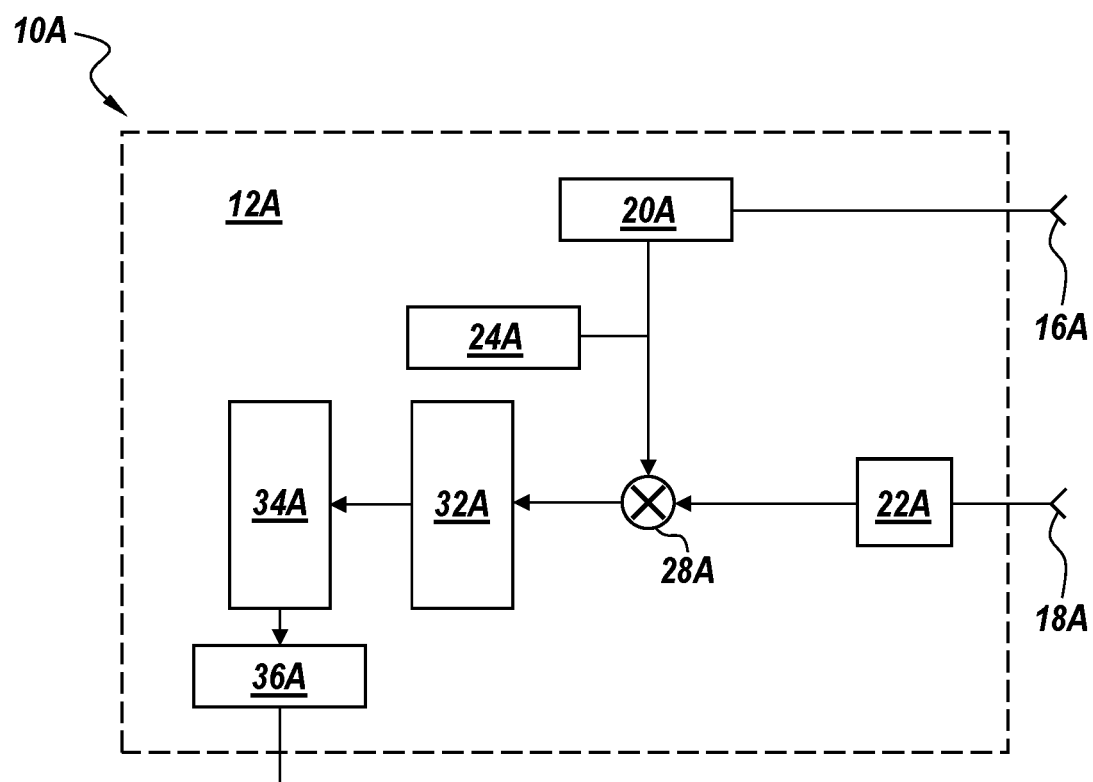
FIG. 1A includes a schematic block diagram of an automotive detection system, such as an automotive radar system, according to some exemplary embodiments.

FIG. 1A includes a schematic block diagram of an automotive detection system 10A, such as an automotive radar system, according to some exemplary embodiments. It is noted that, although the following detailed description refers to system 10A as an automotive radar system as an exemplary illustrative embodiment, the present disclosure is directed to automotive detection systems in general and can be, for example, automotive radar systems, automotive LiDAR systems, or other such detection systems. The description herein of radar system components and signal processing are applicable to analogous components and signal processing of LiDAR systems. System 10A of FIG. 1A includes one or more detection modules such as radar sensor modules 12A for processing automotive radar signals, in accordance with some exemplary embodiments. Referring to FIG. 1A, system 10A includes one or more radar modules 12A, which process radar transmit and receive signals which are compatible with the radar detection and monitoring system 10A in the host automobile. Radar module 12A generates and transmits radar signals into the region adjacent to the host vehicle that is being monitored by system 10A. Generation and transmission of signals is accomplished by RF signal generator 24A, radar transmit circuitry 20A and transmit antenna 16A. Radar transmit circuitry 20A generally includes any circuitry required to generate the signals transmitted via transmit antenna 16A, such as pulse shaping/timing circuitry, transmit trigger circuitry, RF switch circuitry, or any other appropriate transmit circuitry used by radar system 10A.

Radar module 12A also receives returning radar signals at radar receive circuitry 22A via receive antenna 18A. Radar receive circuitry 22A generally includes any circuitry required to process the signals received via receive antenna 18A, such as pulse shaping/timing circuitry, receive trigger circuitry, RF switch circuitry, or any other appropriate receive circuitry used by the radar system. The received radar signals are processed by radar receive circuitry 22A to generate processed receive signals, which are forwarded to a mixer 28A, which mixes the processed receive signals with an RF signal from RF signal generator 24A. The resulting difference signals may be further filtered as required by filtering circuitry 32A to generate baseband signals, which are digitized by analog-to-digital converter circuitry (ADC) 34A to generate receive signals. These digitized baseband receive signals are processed by a processor, such as a digital signal processor (DSP) 36A, to generate target object detections related to objects in the region being monitored by detection system 10A. In some exemplary embodiments, the DSP 36A can perform any and/or all of the processing tasks required to implement the sensor alignment monitoring, compensation and/or correction described herein according to the exemplary embodiments.

Figure 1B:
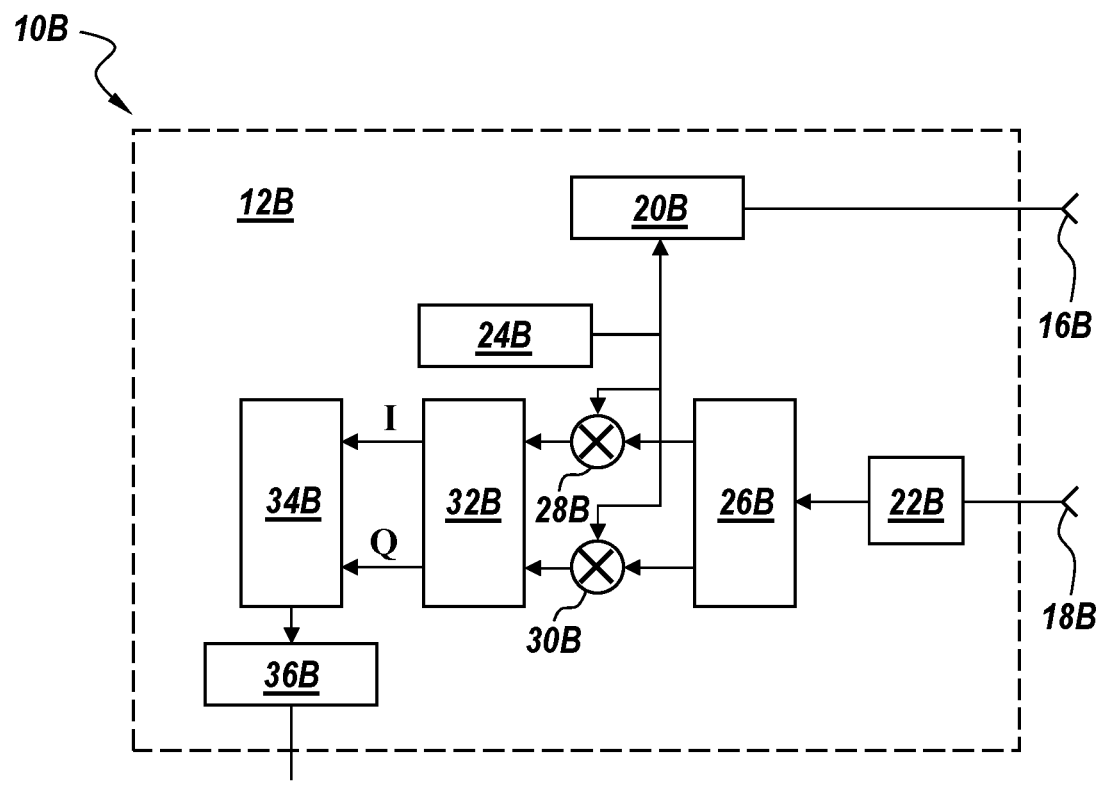
FIG. 1B includes a schematic block diagram of an alternative automotive detection system, such as an automotive radar system, according to some exemplary embodiments.

FIG. 1B includes a schematic block diagram of an alternative automotive detection system 10B, such as an automotive radar system, according to some exemplary embodiments. Referring to FIG. 1B, system 10B includes a radar sensor module 12B, which processes radar transmit and receive signals which are compatible with the radar detection and monitoring system in the host automobile. Radar module 12B generates and transmits radar signals into the region adjacent to the host vehicle that is being monitored by the radar system. Generation and transmission of signals is accomplished by RF signal generator 24B, radar transmit circuitry 20B and transmit antenna 16B. Radar transmit circuitry 20B generally includes any circuitry required to generate the signals transmitted via transmit antenna 16B, such as pulse shaping circuitry, transmit trigger circuitry, RF switch circuitry, or any other appropriate transmit circuitry used by the radar system.

Radar module 12B also receives returning radar signals at radar receive circuitry 22B via receive antenna 18B. Radar receive circuitry 22B generally includes any circuitry required to process the signals received via receive antenna 18B, such as pulse shaping circuitry, receive trigger circuitry, RF switch circuitry, or any other appropriate receive circuitry used by the radar system. In some exemplary embodiments, the received signals processed by radar receive circuitry 22B are forwarded to phase shifter circuitry 26B, which generates two signals having a predetermined phase difference. These two signals, referred to as an inphase (I) signal and a quadrature (Q) signal, are mixed with an RF signal from RF signal generator 24B by mixers 28B and 30B, respectively. The resulting difference signals are further filtered as required by filtering circuitry 32B to generate baseband I and Q signals, labeled "I" and "Q" in FIG. 1B. The baseband I and Q signals are digitized by analog-to-digital converter circuitry (ADC) 34B. These digitized I and Q baseband signals are processed by a processor 36B, which can include such circuitry as a digital signal processor (DSP), associated memory, associated I/O circuitry, communication bus circuitry, and any other circuitry required for carrying out any processing functions of system 10B and/or radar sensor 12B. In some exemplary embodiments, the DSP 36B can perform any and/or all of the processing tasks required to implement the sensor alignment monitoring, compensation and/or correction described herein according to the exemplary embodiments.

In some exemplary embodiments, processor 36B can perform processing such as a fast Fourier Transform (FFT) to generate a plurality of Doppler range bins, which include range, bearing and velocity information for detections during multiple sweeps, i.e., frequency-modulated (FM) chirps, of the radar illumination signal transmitted into the region around the vehicle being analyzed. In some exemplary embodiments, radar sweeps are performed at a rate of approximately 12 Hz. It will be understood that other sweep rates can be used.

Figure 2:
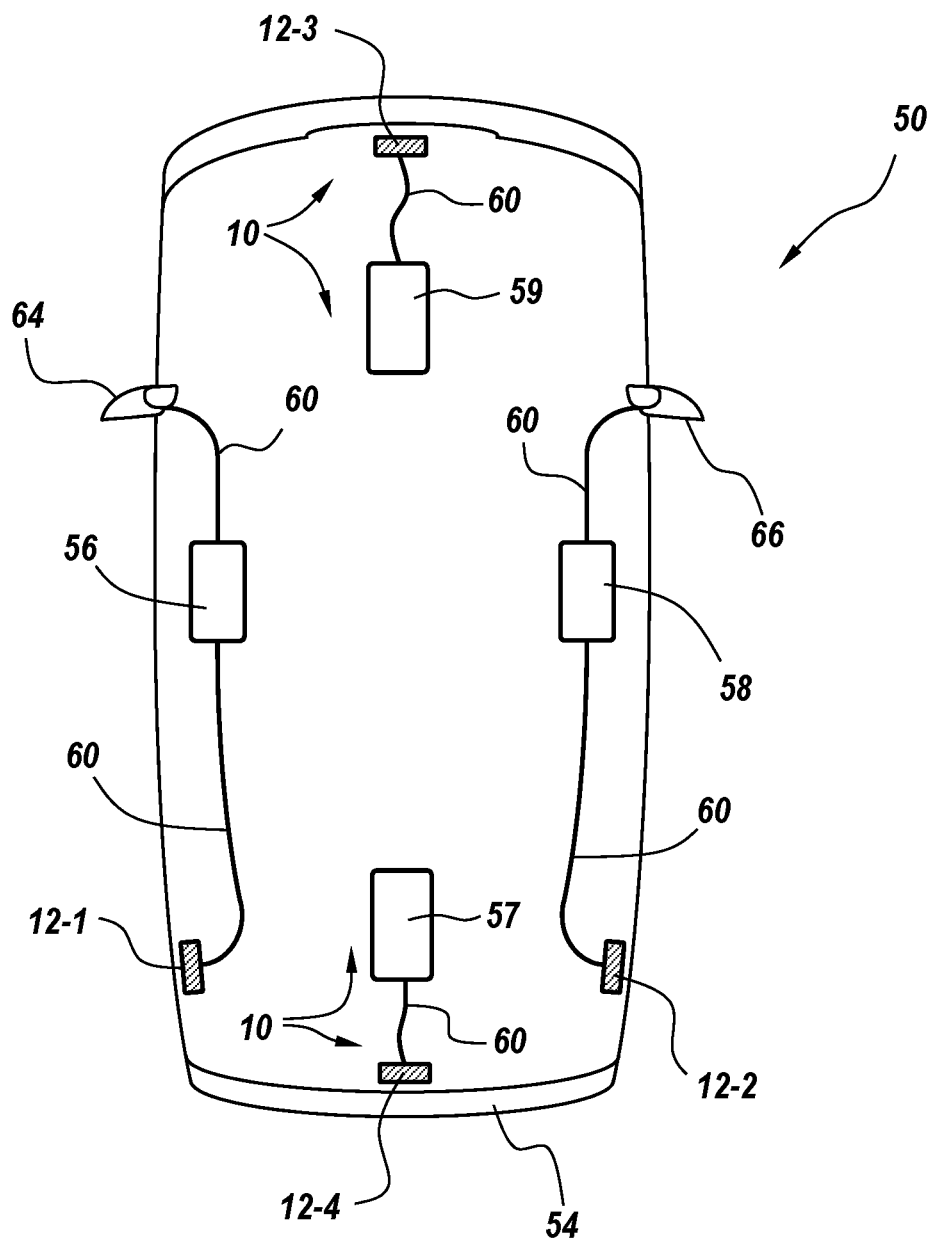
FIG. 2 includes a schematic top view of an automobile or vehicle equipped with an automotive detection system illustrated in FIGS. 1A and/or 1B, which includes one or more radar sensor modules, according to some exemplary embodiments.

FIG. 2 includes a schematic top view of an automobile or vehicle 50 equipped with an automotive detection system 10A, 10B illustrated in FIGS. 1A and/or 1B, respectively, and referred to herein collectively as automotive detection system 10, which includes one or more radar sensor modules 12A, 12B, referred to herein collectively as radar sensor modules 12, according to some exemplary embodiments. A first radar sensor module 12-1 can be connected via a bus 60, which in some exemplary embodiments is a standard automotive controller area network (CAN) bus, to a first CAN bus electronic control unit (ECU) 56. Object detections from radar sensor module 12-1 can be reported to ECU 56, which processes the detections and can provide detection alerts via CAN bus 60. In some exemplary embodiments, the alerts can be in the form of a visible indicator, such as a light-emitting diode (LED) in side mirror 64, which is visible to the driver. Similarly, in some exemplary embodiments, a second radar sensor module 12-2 can be connected via CAN bus 60, to a second CAN bus electronic control unit (ECU) 58. Object detections from radar sensor module 12-2 can be reported to ECU 58, which processes the detections and can provide detection alerts via CAN bus 60 to a visible indicator, such as a light-emitting diode (LED) in side mirror 66. In the particular embodiment illustrated in FIG. 2, first and second radar sensor modules 12-1 and 12-2 of radar system 10 can be part of a blind spot system for reporting object detections in one or both blind spots of automobile 50. It will be understood that the present disclosure is applicable to other types of radar systems 10. For example, in some exemplary embodiments, one or more forward-looking radar sensor modules 12-3 can be connected via CAN bus 60 to a third CAN bus electronic control unit (ECU) 59, and one or more rear-looking radar sensor modules 12-4 can be connected via CAN bus 60 to a fourth CAN bus electronic control unit (ECU) 57. ECUs 57 and 59 can process target object detections from radar sensor modules 12-3 and 12-4, respectively, and can provide detection alerts to a visible indicator or to a vehicle system process for appropriate processing and management of detections.

It will be understood that, according to the present disclosure, detection system 10 can have many configurations, each including different numbers and locations of sensor modules 12. For example, detection system 10 can include one or more forward-looking sensor modules 12, one or more rear-looking sensor modules 12, and/or one or more side-looking sensor modules 12. Data gathered by sensor modules 12 can be processed by one or more processors, e.g., ECUs(s), to carry out the various features implemented by detection system 10. These features can include, but are not limited to, at least one or any combination of any subset of: a blind spot detection feature, a rear cross traffic detection feature, a lane change assistance feature, a trailer detection feature, a safe door opening feature an adaptive cruise control feature, and an autonomous braking feature.

Figure 3:
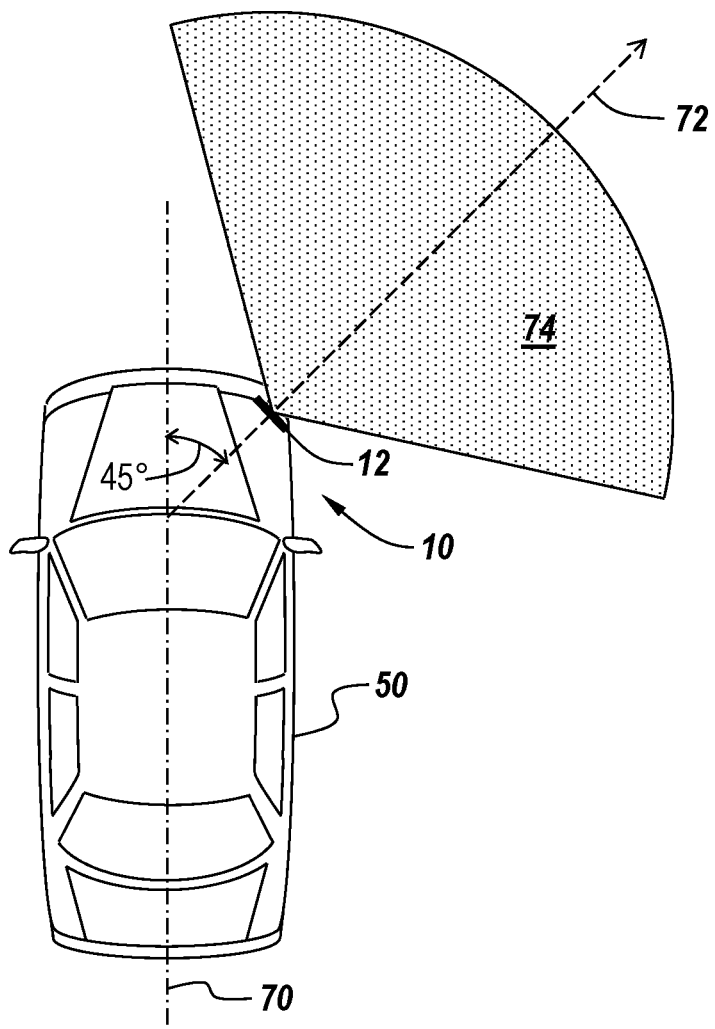
FIG. 3 includes a schematic top view of an automobile or vehicle equipped with an automotive detection system illustrated in FIGS. 1A and/or 1B, including an exemplary front corner radar sensor module, according to some exemplary embodiments.

In general, sensor modules 12 in automotive detection systems such as detection system 10 described herein in detail are mounted at specified positions and point at a specified angle with respect to the host vehicle. FIG. 3 includes a schematic top view of automobile or vehicle 50 equipped with an automotive detection system 10A and/or 10B, including an exemplary front corner radar sensor module 12, according to some exemplary embodiments. Referring to FIG. 3, front, right corner radar sensor module 12 can be mounted inside the front bumper at the front right corner of vehicle 50. As illustrated in the exemplary configuration of FIG. 3, sensor module 12 can be mounted to point into a region 74 along a pointing direction 72, which forms an angle of, for example, 45°, with respect to a center line 70 of vehicle 50.

In automotive detection systems such as detection system 10, sensor module alignment is important to proper operation. The system and each sensor module should have verification of alignment of each sensor module in the system. To that end, according to the present disclosure, a fast, efficient and accurate means for determining and compensating for antenna pattern distortion, calibrating the antenna pattern and thereby correcting for sensor module misalignment is provided.

This disclosure relates to an approach to calibrating and aligning bearing angle measurement in automotive detection systems such as automotive radar systems. It removes or minimizes the angle measurement bias and errors caused by the lack of the positional knowledge of the radar antennas due to either mechanical mounting tolerance or errors, or distortion of the antenna radiation pattern caused by the structures surrounding the radar antenna.

The approach of the disclosure uses the Doppler information of the radar measurements from ground-stationary clutter target returns and the radar motion measurements to establish the antenna response as a function of azimuthal angle (sometimes also referred as "bearing") after the radar sensor is installed on the moving platform (an automobile, for example). This response is the calibrated response as opposed to a response measured in a static environment or an anechoic chamber as is typically done for radar sensors. The static response usually does not include any mounting bias or distortion effect which cause errors after the sensor is installed on a vehicle, while the approach of the disclosure corrects those errors without relying on a priori knowledge.

Prior approaches have attempted to use linear frequency modulated (LFM) waveforms to estimate antenna response or mounting biases. However, due to the effect commonly referred to as range-Doppler-azimuth coupling, it is difficult to separate the antenna response from other influences besides azimuth. Prior approaches have relied on discrete scatterers whose availability cannot be guaranteed with sufficient confidence. The approach of the present disclosure makes use of the much more available ground-stationary clutter returns and provides much more predictable performance and fast convergence in day-to-day operations of the radar sensor.

Figure 4:
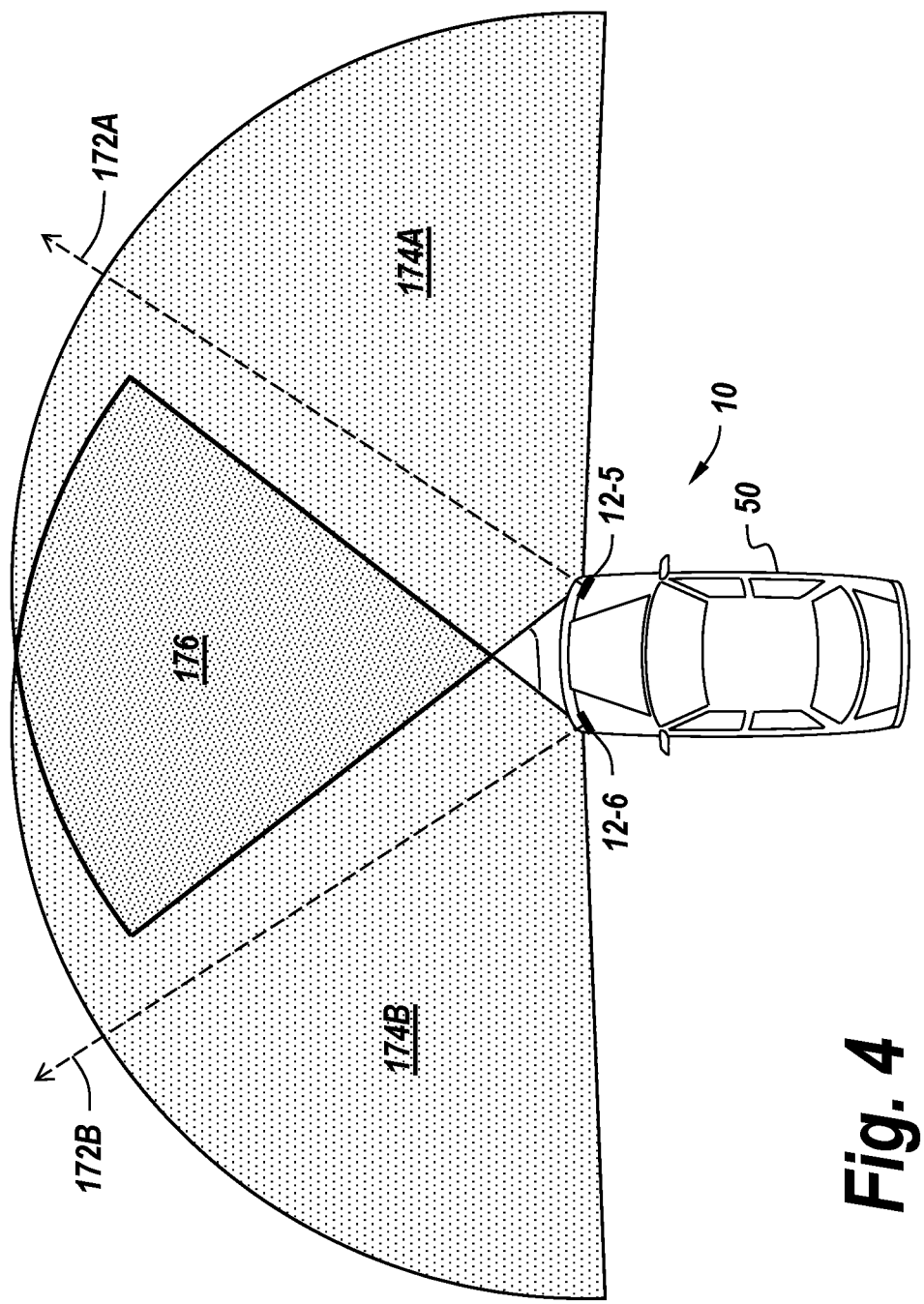
FIG. 4 includes a schematic top view of an automobile or vehicle equipped with an automotive detection system illustrated in FIGS. 1A and/or 1B, which includes at least two front corner radar sensor modules, according to some exemplary embodiments.

FIG. 4 includes a schematic top view of a portion of an automobile or vehicle 50, equipped with an automotive detection system 10A and/or 10B, which includes at least two front corner radar sensor modules 12-5, 12-6, according to some exemplary embodiments. Referring to FIG. 4, right front sensor module 12-5 can be mounted to point into a region 174A along a pointing direction 172A, and left front sensor module 12-6 can be mounted to point into a region 174B along a pointing direction 172B. In general, regions 174A and 174B may overlap in an overlap region 176, which is in the field of view (FOV) of both sensor modules 12-5 and 12-6. Each sensor module 12 is characterized by an alignment bias, which is an angle defining the extent of the detected misalignment of the sensor module. Long-range radar applications generally require accurate cross-range (if "x" is the direction of travel for the host vehicle, then "y" direction would be cross-range) estimates to make determinations with regard to detections, for example, to determine a lane position of a target with respect to the host vehicle. A single-sensor radar detection approach relies on the responses of individual antenna elements to estimate azimuth, and then converts that azimuth estimate to x and y coordinates. Sources of azimuth error include sensor azimuth bias in which electrical radar boresight is misaligned and/or mounting of the sensor on the vehicle is out of alignment. Sensor azimuth error can also be due to interference from one or more mechanical features of the host vehicle, such as the bumper fascia. Also, vehicle heading errors, in which the velocity vector and a vehicle body reference can be misaligned.

According to the present disclosure, an approach to azimuth measurement uses in-situ clutter Doppler to derive azimuth without knowledge of the antenna element response. It is understood that automobile radar returns are dominated by detections from ground-stationary clutter objects having a well-defined radial-range-rate/azimuth relationship. According to the present disclosure, this relationship is used to extract useful sensor alignment and/or calibration data to align the sensor and/or calibrate the antenna pattern response. That is, according to the present disclosure, in-situ clutter Doppler measurements are used to correct sensor misalignment and/or to calibrate azimuth angle measurement.

In some exemplary embodiments, radar system 10 uses a continuous wave (CW) waveform and generates 512 samples over a sample interval of 54.4 μsec. The Doppler resolution is 36 Hz, with unambiguous Doppler of ±9.2 kHz. The range rate resolution is 22.4 cm/s, with unambiguous range rate of ±57.4 m/s. Although other waveforms may be used according to the present disclosure, the above waveform provides a long integration time, wide unambiguous Doppler, narrow resolution bandwidth and detects objects without range-Doppler coupling. It will be understood that any waveform which provides a Doppler measurement can be used. These waveforms can include, but are not limited to pulsed Doppler, FMCW, step FM or other waveforms.

Figure 5:
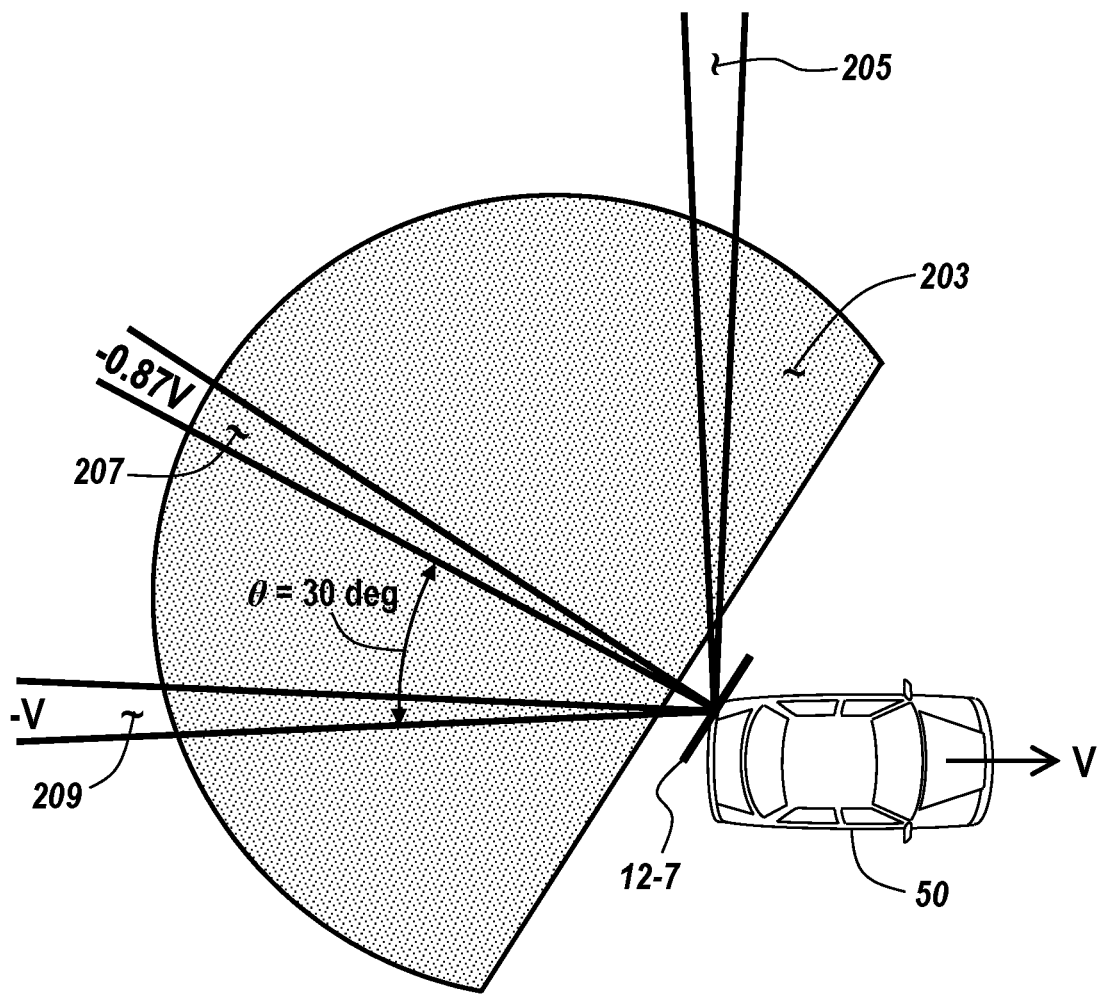
FIG. 5 includes a schematic diagram of an automobile or vehicle, equipped with an automotive detection system, illustrated in FIGS. 1A and/or 1B, which includes a rear-left-facing sensor module, according to some exemplary embodiments.

FIG. 5 includes a schematic diagram of an automobile or vehicle, equipped with an automotive detection system 10A and/or 10B, which includes a rear-left-facing sensor module 12-7, according to some exemplary embodiments. Sensor module 12-7 of FIG. 5 monitors and receives object detections from a region 203 at the rear left of host vehicle 50. Vehicle 50 is moving in the direction and speed illustrated by velocity vector V, which can be provided by a velocity monitoring system of vehicle 50. As a result, stationary ground clutter in region 203 will result in a measurable detection signal in Doppler which has the relationship with the velocity V of vehicle 50:

$$\frac{\partial r}{\partial t} = -V\cos\theta,$$

where θ is the angle between the line to the detected object and the positive direction of travel of vehicle 50, i.e., the azimuth with respect to the vehicle velocity. For example, stationary clutter object detections at direction 205 form an angle θ of 90 degrees with vector V, resulting in a velocity $$\frac{\partial r}{\partial t} = 0, \text{i.e.,}$$

the object appears to be at a constant range with respect to vehicle 50. Similarly, objects directly behind vehicle 50 at direction 209 will have a Doppler velocity V; objects at an angle θ of 30 degrees with respect to vector −V at direction 207 will have a velocity $$\frac{\partial r}{\partial t} = -V\cos(180° - 30°) = 0.866\ V.$$

It is noted that, typically, the speed of a vehicle is given as a positive number, for example, 10 m/s). However, the range rate as measured by the radar can have both positive values, indicating an object is moving away, or negative values, meaning the object is moving closer. If the vehicle is moving at 10 m/s forward, for example, then the ground clutter will appear to moving away directly behind the vehicle, therefore having a positive range rate, i.e., range increasing with time.

It is noted that, in general, moving target objects such as other moving vehicles, will be detected in region 203. Those objects will generally be statistical outliers, since the large majority of detections will generally be from stationary ground clutter objects. For example, stationary ground clutter targets may account for 90% of the detections, while moving targets may account for only 10% of the detections. According to exemplary embodiments, these moving target object detections can be eliminated from the results by some filtering means, such as a statistical filter, e.g., an order statistic. Alternatively, a threshold Doppler can be applied, and object detections having Doppler velocities above the threshold can be eliminated since they are moving and, therefore, are not stationary ground clutter. That is, according to exemplary embodiments, data from moving targets is filtered out so that only data from stationary ground clutter is used.

Hence, system 10 will report apparent azimuth based on the signals received at the antenna array and process by system 10. According to the present disclosure, a mapping between the reported apparent azimuth and the azimuth relative to velocity, which is determined from the detected Doppler of ground-stationary clutter detections can be generated. This mapping provides a calibration of the antenna pattern of the sensor to providing more accurate azimuth determinations, such that misalignment of the sensor can be compensated for.

Figure 6A:
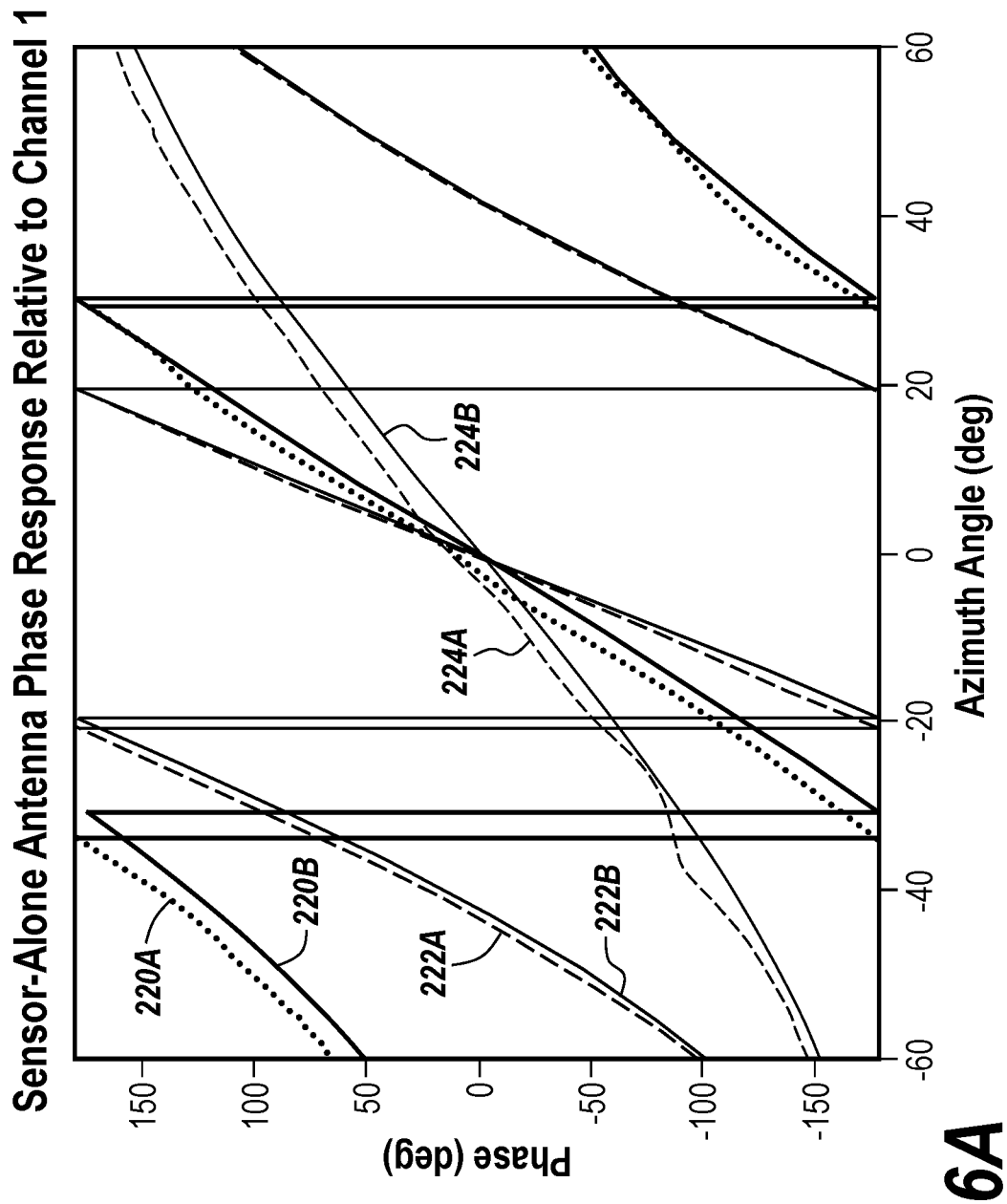
FIGS. 6A and 6B include curves of phase response for an exemplary four-channel, i.e., four-antenna-element, radar sensor, illustrating phase versus azimuth angle, for three channels, e.g., channels 2, 3 and 4, with respect to a single channel, e.g., channel 1.
Figure 6B:
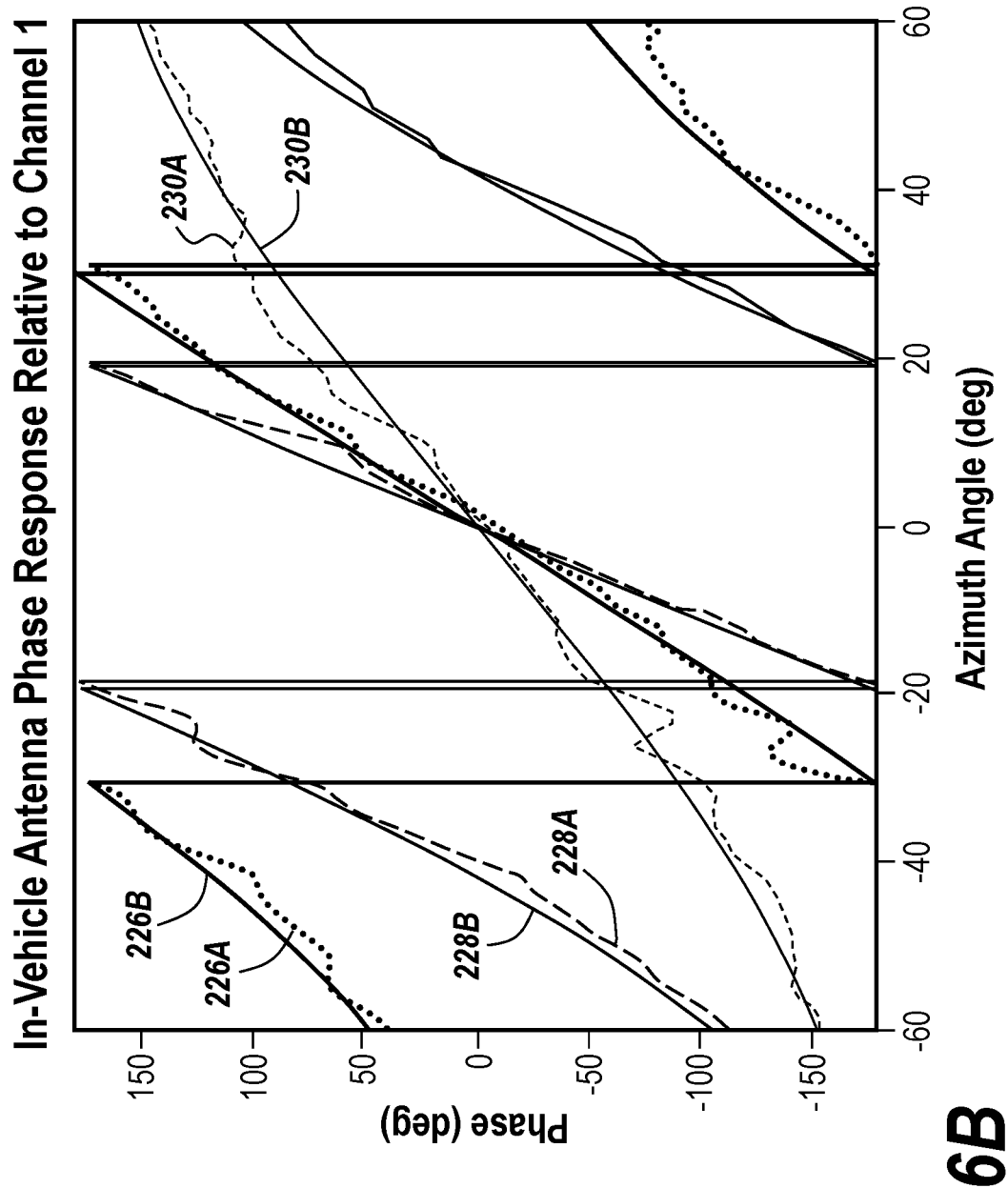

FIGS. 6A and 6B include curves of phase response for an exemplary four-channel, i.e., four-antenna-element, radar sensor, illustrating phase versus azimuth angle, for three channels, e.g., channels 2, 3 and 4, with respect to a single reference channel, e.g., channel 1. FIG. 6A illustrates the phase response for a stand-alone sensor, i.e., a sensor that has not been installed in an automobile. FIG. 6B illustrates the phase response for an in-vehicle sensor, i.e., a sensor that is installed in a vehicle. Referring to FIG. 6A, curves 220A, 222A and 224A are actual measured responses for channels (antenna elements) 2, 3 and 4, respectively, and curves 220B, 222B and 224B illustrate the theoretical or ideal responses for channels (antenna elements) 2, 3 and 4, respectively, for the stand-alone sensor. Similarly, referring to FIG. 6B, curves 226A, 228A and 230A are actual measured responses for channels (antenna elements) 2, 3 and 4, respectively, and curves 226B, 228B and 230B illustrate the theoretical or ideal responses for channels (antenna elements) 2, 3 and 4, respectively, for the in-vehicle sensor.

As noted from FIG. 6A, for the stand-alone sensor, deviations of actual measurements from the theoretical or ideal patterns are relatively small, uniform and predictable. These deviations can be attributable to various expected and predictable factors such as electrical and mechanical tolerances and other factors. In prior systems, these in-factory measured deviations from theoretical expectations are used to generate a theoretical calibration table or curve, which is used later during actual in-vehicle operation to attempt to correct for deviations from theoretical expectations of actual in-vehicle azimuth calculations from actual target object detections. However, as shown in FIG. 6B, after installation of the sensor in a vehicle, due to various distortion factors, deviations of actual measured responses from the theoretical or ideal responses are more pronounced, more variable, and, therefore, less predictable. The theoretical calibration table or curve generated using stand-alone, in-factory sensor measurements results in inaccurate and inconsistent azimuth measurements.

In contrast to these prior approaches, according to the antenna pattern calibration and sensor alignment approach of the present disclosure, these in-vehicle distortions are compensated for in-situ, i.e., in the vehicle during sensor operation, to provide more accurate antenna azimuth determinations. According to the present disclosure, one of the channels (antenna elements) is used as a reference channel to normalize the other channels. The Doppler of detected ground-stationary clutter is used to calculate the "true" azimuth. The large volume of data from clutter detections is filtered, such as by application of an order statistic, to separate data from moving target objects, to generate an antenna phase calibration curve or table. Because this calibration curve or table is generated in-situ, i.e., in the vehicle during operation, it accounts for distortions introduced by installation of the sensor in the vehicle. The newly generated antenna calibration table or curve is used for accurate azimuth estimation for real target objects. This calibration approach of the present disclosure can replace the theoretical or factory or end-of line (EOL) calibration table or curve generated at the sensor point of manufacture.

Figure 7:
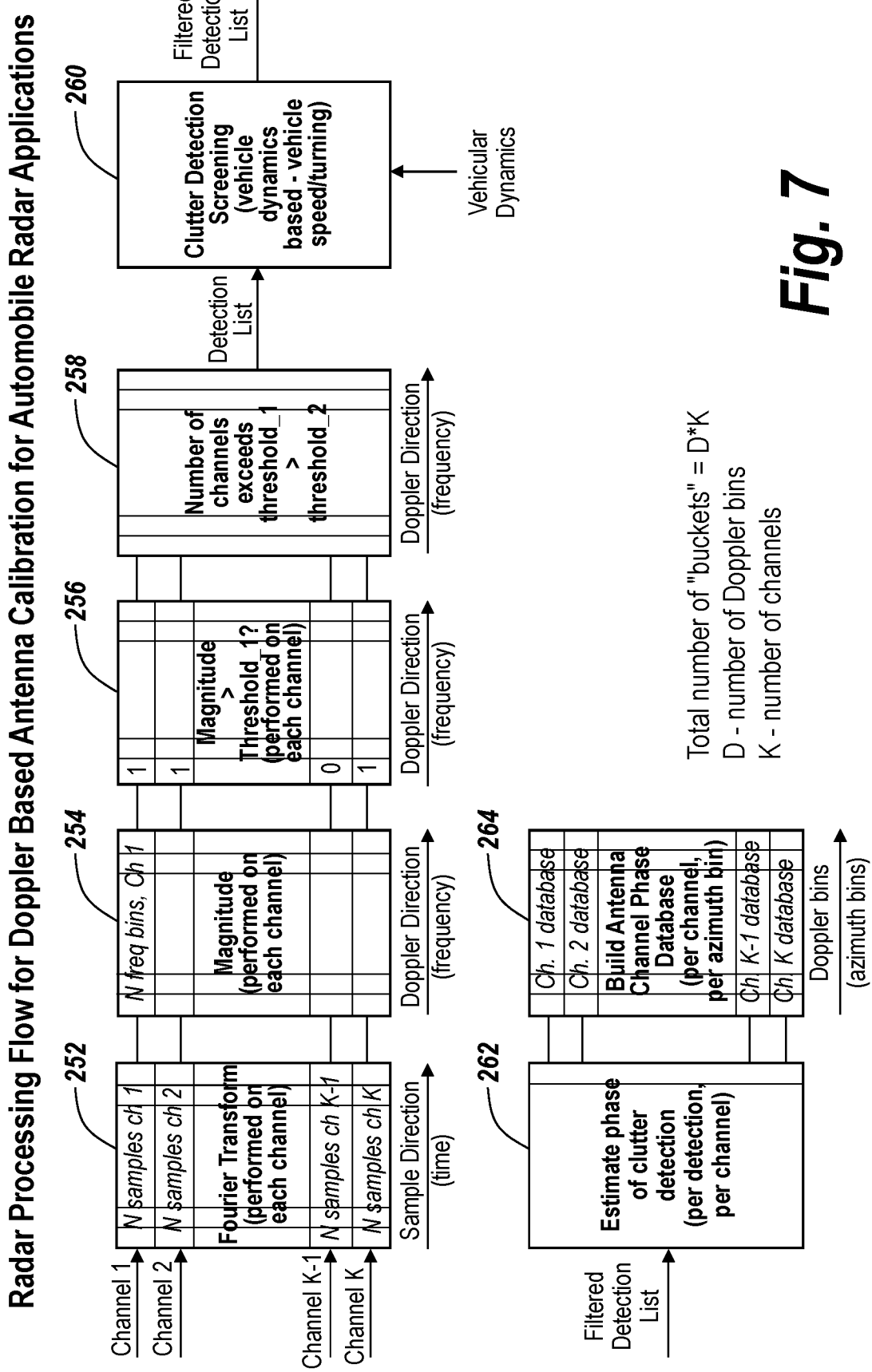
FIG. 7 includes a schematic functional block diagram and logical flow diagram of an approach to radar antenna pattern calibration and radar sensor misalignment compensation, according to some exemplary embodiments.

FIG. 7 includes a schematic functional block diagram and logical flow diagram of the approach to radar antenna pattern calibration and radar sensor misalignment compensation, according to some exemplary embodiments. Referring to FIG. 7, as shown at 252, sample data for returns received at each of a quantity K channels, i.e., K antenna elements, are received for processing by processing circuitry. In the illustrated embodiments, each channel includes N samples. Frequency transformation processing, such as a Fast Fourier Transform (FFT), is performed on the N samples for each of the K channels. The result of the FFT is generation of a number of Doppler bins, which in the illustrated embodiments is K*N total bins. As indicated at 254, a magnitude of each complex value in the Doppler bins is then computed. At 256, each magnitude is compared to a threshold, indicated as Threshold_1 in FIG. 7. A tally or count of magnitudes that exceed Threshold_1 is maintained in a table at 256. In the exemplary illustration, at the first Doppler bin for each channel, a "1" is entered for channels where the magnitude exceeds Threshold_1, and a "0" is entered for channels where it is not exceeded; with the entries for the first Doppler frequency being illustrated. These entries are made in the illustrated table for each Doppler bin over each channel. Next, as shown at 258, the number of channels having a magnitude exceeding Threshold_1 is determined. For example, in the case illustrated at 256, this number is three. That number of channels is compared to a second threshold, referred to herein as Threshold_2. If the number of channels exceeds Threshold_2, then it is concluded that a detection is indicated. This process is performed for each channel and Doppler bin to identify detections to generate a detection list.

As indicated at 260, clutter detection screening is performed on the detection list to exclude the effects of vehicle dynamics. For example, vehicle dynamics which indicate vehicle steering angles in the case of a turn, or vehicle velocity which would indicate a stopped vehicle, are filtered to ensure that the detections being relied upon are related to ground-stationary clutter. This step results in generation of a filtered detection list.

As illustrated at 262, the filtered detection list is used to generate a table of phase per channel for each detection. That is, for each detection, a set of phases, i.e., one phase per channel, is identified. By the nature of this identification, the corresponding azimuth of the detection is associated with the phases of each of the K channels. That is, since the azimuth for each detection is determined, the corresponding set of phases associated with that detection provides an unambiguous identification of the azimuth.

As shown at 264, these channel phase-azimuth associations can be used to build an antenna channel phase database, per channel, per azimuth bin. According to exemplary embodiments, the azimuth is calculated from the Doppler measurement from clutter detections. For example, if a clutter object is detected at a Doppler of 5 m/s, while the host vehicle is moving at a speed of 10 m/s, then the azimuth will be 60 degrees, according to $$\frac{\partial r}{\partial t} = -V \cos \theta,$$

described above. Referring to block 264 in FIG. 7, the term "Doppler bin" is used instead of azimuth along the horizontal axis, since the relation between azimuth and Doppler bin is one-to-one. The terms "Doppler bins" and "azimuth bins" are used interchangeably. The number of channels herein is referred to as K, and the number of Doppler bins is referred to as D, such that the total number of "buckets" is given by D*K. Block 264 can be viewed to illustrate a database with D by K buckets. Each bucket contains the electrical phases calculated from the many detections of clutter. For example, in the bucket with D=10 and K=3 (meaning the $10^{th}$ Doppler bin and $3^{rd}$ antenna channel), there are 121 phases measured from clutter detection. The order statistic filter using 50% percentile as the threshold will pick the $61^{st}$ phase of the list of 121 phases arranged in an ascending or descending order. With each of the D bins populated and the order statistic filter applied, then a phase-vs.-azimuth correspondence can be tabulated for each channel K.

During normal operation, the antenna channel phase database is used as a calibration look-up table to account for distortions in azimuth calculations. When actual target detections are generated, the sets of phases associated with the individual channels are identified in the calibration look-up table. The azimuth associated in the calibration look-up table with the measured phases is determined to be the actual azimuth to the target object. Hence, the technique builds a set of K phase-vs-azimuth relations from the database. In an ideal situation, this set of curves 226B, 228B, and 230B generated by the techniques of the present disclosure, follows a known pattern as illustrated in FIG. 6B. This set of curves are used as follows: if there is a true target detection from which a set of K phases are measured, one can look up the K curves as illustrated in FIG. 6B and find the azimuth at which the phases of the curves best match the measured phases.

One way to accomplish this complex table look-up is by using a correlation method. Under this technique of the present disclosure, the set of K measured phases is considered a vector of K elements. The K phase curves are considered a set of D vectors of the same length, each corresponding to a set of phases at a specific azimuth. One can calculate the correlation coefficients of the measured phase vector with all the D vectors of the table, and find the one that is the maximum. The azimuth of this vector can be considered the azimuth of the target.

According to this correlation approach of the present disclosure, from the database of phase response curves illustrated in FIG. 6B, a vector $\alpha(\theta_d)$ can be created at each of the D Doppler bins, i.e., azimuth angles, as follows:

$$\alpha(\theta_d) = \begin{bmatrix} e^{-i\phi_{d1}} \\ e^{-i\phi_{d2}} \\ \vdots \\ e^{-i\phi_{dK}} \end{bmatrix}, d = 1, 2, \ldots, D;$$

where $\theta_d$ is the azimuth angle corresponding to the $d^{th}$ Doppler bin, and $\emptyset_{dK}$ is the electrical phase response of the $K^{th}$ antenna channel. A target detected by the radar system is considered. From this detection, a set of K phases $\varphi_1, \varphi_2, \ldots, \varphi_K$ can be calculated to form a vector v, given by:

$$v = \begin{bmatrix} e^{-i\varphi_1} \\ e^{-i\varphi_2} \\ \vdots \\ e^{-i\varphi_K} \end{bmatrix}.$$

The phase response curves of FIG. 6B can be considered to be a set of D vectors, each vector being of length K and corresponding to an azimuth angle as described above. The azimuth angles can be mapped one-to-one to the Doppler bins, and there are D Doppler bins. Accordingly, the correlation coefficient between the measured phase vector v and the D vectors from the database. Specifically, a set of D correlation coefficients $\rho(\theta_d)$ can be calculated, i.e., estimated, from the vector-inner-product, i.e., dot product, between phase vector v and each of the D vectors from the database, resulting in D coefficients, as follows:

$$\rho(\theta_d) = |\alpha(\theta_d)^H v/K|, d=1,2,\ldots,D.$$

Note $\alpha^H$ is Hermittian transpose of vector $\alpha$. The angle corresponding to the maximum correlation coefficient $\vartheta$ is the azimuth bearing for the detection, that is, $\vartheta = \mathrm{argmax}(\rho(\theta))$.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A method for calibrating an antenna pattern of a sensor in an automotive detection system, comprising:
    transmitting transmitted signals into a region;
    receiving reflected signals generated by reflection of the transmitted signals and generating receive signals indicative of the reflected signals;
    receiving the receive signals;
    generating a signal indicative of velocity of the sensor;
    processing the receive signals to generate detections of objects in the region, the objects in the region including one or more ground-stationary clutter objects in the region, each of the detections being associated with a detected azimuth and detected relative velocity of each ground-stationary clutter object;
    for each of a plurality of angles with respect to a boresight of an antenna of the sensor, processing the detected azimuth and detected velocity of one of the one or more ground-stationary clutter objects and the signal indicative of velocity of the sensor to generate an actual antenna pattern for the antenna of the sensor; and
    using the actual antenna pattern to adjust an assumed antenna pattern and using a correlation azimuth estimate to generate a calibrated antenna pattern for the antenna of the sensor.

2. The method of claim 1, further comprising, using the calibrated antenna pattern, determining an angle of misalignment of the sensor.

3. The method of claim 1, wherein the objects in the region further comprise objects which are moving with respect to ground.

4. The method of claim 3, further comprising filtering the detections of objects in the region to substantially eliminate detections of objects which are moving with respect to ground.

5. The method of claim 4, wherein the filtering is a statistical filtering.

6. The method of claim 4, wherein the filtering comprises using an order statistic.

7. An automotive radar sensor with calibration of an antenna pattern, comprising:
    a transmitter for transmitting transmitted signals into a region;
    a receiver receiving reflected signals generated by reflection of the transmitted signals and generating receive signals indicative of the reflected signals; and
    a processor for:
        receiving the receive signals,
        generating a signal indicative of velocity of the sensor,
        processing the receive signals to generate detections of objects in the region, the objects in the region including one or more ground-stationary clutter objects in the region, each of the detections being associated with a detected azimuth and detected relative velocity of each ground-stationary clutter object,
        for each of a plurality of angles with respect to a boresight of an antenna of the sensor, processing the detected azimuth and detected velocity of one of the one or more ground-stationary clutter objects and the signal indicative of velocity of the sensor to generate an actual antenna pattern for the antenna of the sensor, and using the actual antenna pattern to adjust an assumed antenna pattern to generate a calibrated antenna pattern for the antenna of the sensor; wherein the processor generates a correlation azimuth estimate to generate the calibrated antenna pattern.

8. The automotive radar sensor of claim 7, wherein the processor uses the calibrated antenna pattern to determine an angle of misalignment of the sensor.

9. The automotive radar sensor of claim 7, wherein the objects in the region further comprise objects which are moving with respect to ground.

10. The automotive radar sensor of claim 9, wherein the processor filters the detections of objects in the region to substantially eliminate detections of objects which are moving with respect to ground.

11. The automotive radar sensor of claim 10, wherein filtering performed by the processor comprises statistical filtering.

12. The automotive radar sensor of claim 10, wherein filtering performed by the processor uses an order statistic.

* * * * *